Figure 1:
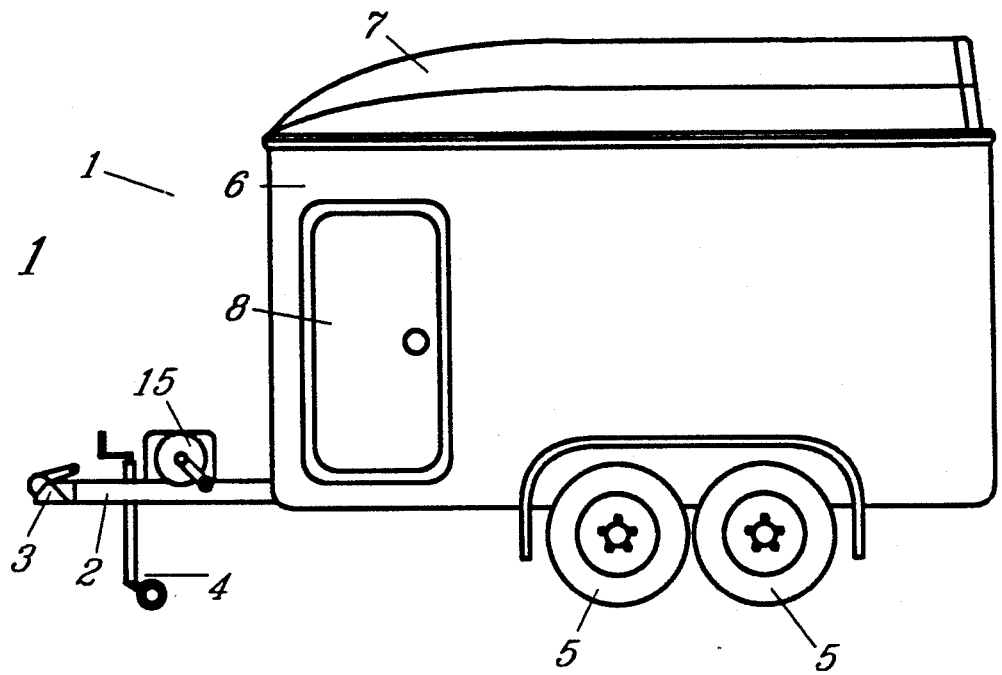

United States Patent [19]

Muno

[11] Patent Number: 5,181,760
[45] Date of Patent: Jan. 26, 1993

[54] MOTOR VEHICLE TRAILER WITH COUNTERBALANCING WEIGHTS

[76] Inventor: Paul Muno, Am Kalvarienberg 2, D-8961 Untrasried-Hopferbach, Fed. Rep. of Germany

[21] Appl. No.: 845,832

[22] Filed: Mar. 6, 1992

Related U.S. Application Data

[63] Continuation of Ser. No. 680,902, Apr. 5, 1991, abandoned.

[30] Foreign Application Priority Data

Apr. 5, 1990 [DE] Fed. Rep. of Germany ... 9003948[U]

[51] Int. Cl.$^5$ ............................ B60P 3/07; B60P 3/10
[52] U.S. Cl. ........................... 296/181; 296/98; 296/157; 280/759
[58] Field of Search ............ 296/98, 157, 181, 37.14, 296/37.1; 280/414.1, 757-759; 248/640; 212/196; 414/7.9; 114/124

[56] References Cited

U.S. PATENT DOCUMENTS

| | | | |
|---|---|---|---|
| 650,558 | 5/1900 | Hatch | 248/640 X |
| 1,455,994 | 5/1923 | Cowan | 296/157 |
| 1,799,650 | 4/1931 | Schoenburg | 248/640 X |
| 2,310,431 | 2/1943 | Hart | 296/157 |
| 2,429,551 | 10/1947 | Hitzemann | 248/640 X |
| 2,594,910 | 4/1952 | Germann | 296/98 |
| 3,029,088 | 4/1962 | Loef | 280/759 X |
| 3,193,321 | 7/1965 | Rose | 296/157 |
| 3,287,058 | 11/1966 | Wells | 296/37.14 |
| 3,843,001 | 10/1974 | Willis | 414/462 |
| 4,261,613 | 4/1981 | Alford | 296/157 X |
| 4,682,960 | 7/1987 | Hendrickson | 248/640 X |
| 4,923,242 | 5/1990 | Gentzhorn | 296/157 |
| 4,971,356 | 11/1990 | Cook | 280/759 |

FOREIGN PATENT DOCUMENTS

| | | | |
|---|---|---|---|
| 2363150 | 7/1974 | Fed. Rep. of Germany | 296/157 |
| 2535290 | 2/1977 | Fed. Rep. of Germany | 296/157 |
| 2539093 | 3/1977 | Fed. Rep. of Germany | 296/157 |
| 2378428 | 9/1978 | France | 296/157 |
| 0244679 | 12/1985 | Japan | 280/758 |

OTHER PUBLICATIONS

J. C. Whitney, Catalog 516J, Mar. 1990, p. 33, "Cycle Rail Kit".

*Primary Examiner*—Dennis H. Pedder
*Attorney, Agent, or Firm*—Cushman, Darby & Cushman

[57] ABSTRACT

A motor vehicle trailer is provided with counterbalancing weights and a plurality of recesses formed in the floor of the trailer for engaging the counterbalancing weights. The weights can be positionally interchanged among the recesses so as to counterbalance the contents of the trailer and provide stability in use. A carriage for a boat hull upside down atop the trailer, rear access to the trailer interior, and an openable top in the form of a roller blind are included.

5 Claims, 2 Drawing Sheets

MOTOR VEHICLE TRAILER WITH COUNTERBALANCING WEIGHTS

This is a continuation of application Ser. No. 07/680,902, filed on Apr. 5, 1991, which was abandoned upon the filing hereof.

The invention relates to a motor vehicle trailer provided with counterbalancing weights which can be positioned appropriately to balance any load held therein.

The purpose of the invention is to design such a trailer for leisure activities such that it provides as complete and convenient a solution as possible when the equipment involved is transported and used. However, when such a trailer is loaded for use, the problem arises wherein unless the contents of the trailer are properly positioned just so, the trailer then becomes unstable and is prone to tip. In the solution to this problem proposed by the invention, a plurality of recesses for holding counterbalancing weights are provided within the floor of the trailer. Counterbalancing weights, which can be interchanged between the recesses, are provided so that the contents of the trailer may be properly balanced, thus providing stability to the trailer when in use.

Other features designed to enhance the utility of the trailer for leisure activities are provided. For example, the hull of a motor boat or another kind of boat is provided as the top, resting upside down on the walls of the interior, while a cover for the interior is provided underneath the hull. Storage space is provided for an outboard motor for the boat hull. The interior of the trailer may be conveniently accessed through a door or doors provided at the back of the trailer.

Although the equipment of trailers with fold-open tops and the provision on the top of elements to secure the hull of a boat have been disclosed in the past, the solution proposed by the present invention makes a comparatively heavy top unnecessary. Even so, the trailer can still be closed up after the boat has been removed.

The covering operation can be carried out particularly simply if in accordance with the invention, the cover is designed in the form of a roller blind.

In an advantageous further development of the invention, holding devices are located in the interior of the trailer body to secure boat equipment, one or two motor cycles, water-skis, surf-boards and/or other leisure articles, such as camping equipment.

It is also very advantageous if in accordance with the invention, at least one longitudinally positioned, preferably U-shaped rail is located on the inside of the floor, which is provided to hold the wheels of a motor cycle.

This rail, two of which can of course be provided parallel to each other as well, guarantees that the motor cycle is held in place securely. All that is needed in addition, are lateral supports which engage upper sections of the motor cycle.

Extra stops at the front and the back effectively prevent the motor cycle from rolling away.

It is also advantageous if in accordance with the invention an extendable rail, the free end of which can rest on the ground when it is extended, is provided in the area of the motor cycle parking space, preferably on the underneath of the floor.

Such a rail makes it particularly easy to load and unload the motor cycle.

This loading and unloading of the motor cycle is facilitated considerably if in accordance with the invention, the extendable rail can be moved longitudinally with a pivot bearing at the back end of the trailer.

In a further development of the invention a door consisting of one or two parts with a vertical axis of rotation is located at the back of the trailer.

The loading and unloading operations can be carried out particularly simply with a door designed in this way.

It is, however, also possible in accordance with the invention, that a tail-gate which opens downwards and can be used as an access ramp is provided at the back of the trailer.

It is also very advantageous if in accordance with the invention, a door is provided in one side panel of the trailer body, behind which storage space is provided for preferably one outboard motor.

Outboard motors are relatively heavy, particularly when they are powerful; they can, however, be handled comparatively simply with the solution proposed by the invention.

They are made even easier to handle if in accordance with a further development of the invention, the outboard motor is attached to the door and moves out when the door is opened.

Use of the trailer is made particularly simple if in accordance with the invention, rails that can be pulled out towards the back are provided in the upper section of the two side panels of the trailer body as supports to help in loading and removing the hull of the boat.

The boat is attached to the trailer in a particularly simple way if in accordance with the invention hinged closure elements are provided in the upper section of the trailer body that engage the hull and attach it to the trailer.

It is also very advantageous if in accordance with the invention, a cable winch, with which the boat can be pulled towards and onto the trailer body, is located preferably in the front section of the trailer.

To remove the boat, it is pushed towards the back and, when it reaches the point at which it tips, it is lowered down and turned over its stern so that is is the right way up for use. The cable winch is a great help, particularly when the boat is being lowered and turned over. This is of course even more the case when the boat is being loaded, when the operations are carried out in the opposite order. The cable winch can, however, also be used to pull the boat out of the water and to the trailer.

In a particular advantageous development of the invention, the body of the trailer is produced from FRP and is preferably designed to consist of one single part.

This makes it possible to adapt the body to individual requirements.

It is also very advantageous if in accordance with the invention, an insert made of FRP is provided in the interior of the trailer, in which the elements for holding the individual articles that are to be transported are molded.

This feature has a particular favorable effect on the design of the interior.

One embodiment of the invention is illustrated in the drawings.

Figure 2:
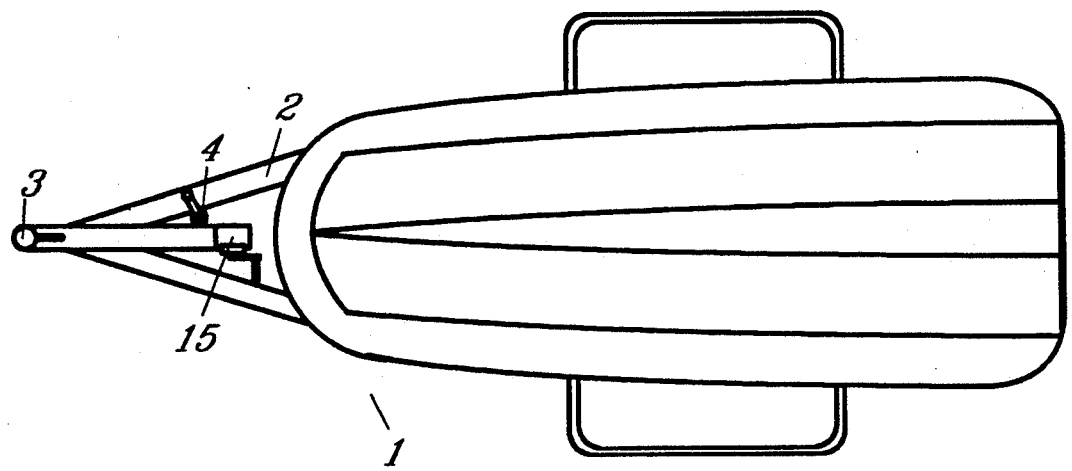
Figure 3:
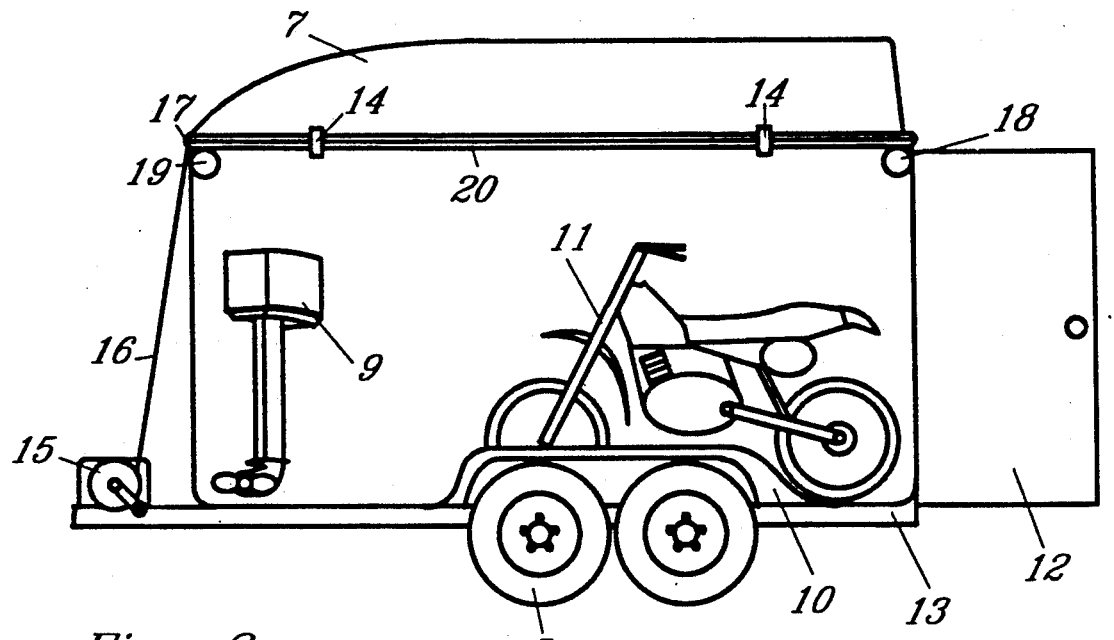
Figure 4:
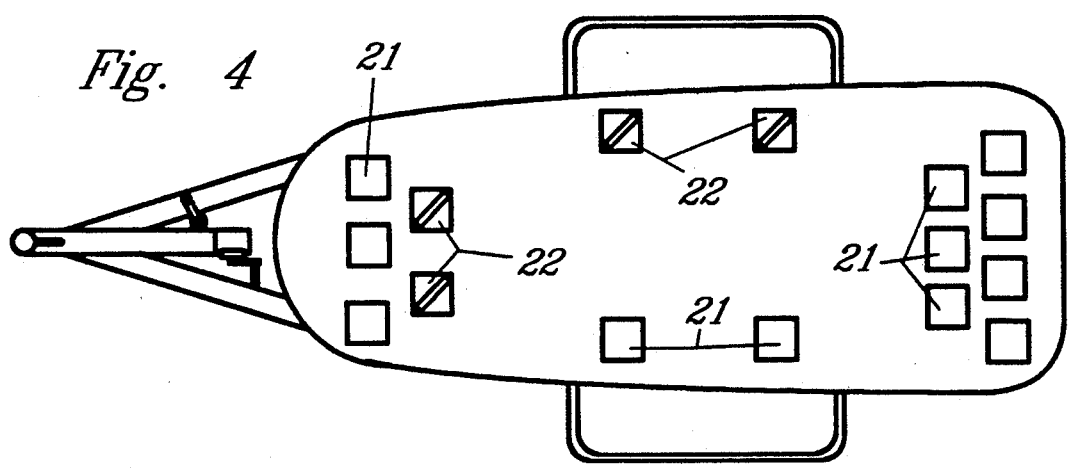

FIG. 1 is a side view of a motor vehicle trailer with the hull of a boat in position as the top, FIG. 2 is a top view of the trailer and the bottom of the hull of the boat, FIG. 3 is a cut-away side view of the complete trailer and FIG. 4 shows the inside of the floor with recesses to accommodate counterbalancing weights.

In FIGS. 1 and 2 is a motor vehicle trailer which is equipped in the usual way with a chassis 2, a coupling 3, a support wheel 4—the height of which can be adjusted—and four wheels 5 arranged in tandem. A body 6, on which the hull 7 of a motor boat rests upside down to form a top, is located on the chassis 2. A door 8, which facilitates access to the front section of the trailer body, is located in the left side panel of the body 6. A door that has two wings and is not visible in FIGS. 1 and 2 is also provided at the back of the body 6.

In FIG. 3, the side panel of the body has been shown cut away, as a result of which the equipment inside can be seen. An outboard motor 9 that is used to drive the motor boat 7 is located behind the side door 8. The two wheels of a motor cycle 11 are in a recess 10 in the floor of the body that is made from FRP to have the appropriate shape, so that the motor cycle is already held in place very securely. It can be secured additionally by further supports not shown in the drawings that engage the upper sections of the motor cycle 11. FIG. 3 also shows one—open—wing 12 of a two-wing door, which provides access to the interior of the body even when the hull is in position on top. A single-wing door or a tail-gate that opens downwards can be provided instead of this door.

A rail 13, which can be moved longitudinally and the free end of which can be lowered to rest on the ground when it is extended, is located on the underneath of the floor. It is of course also possible to provide not only spaces for two motor cycles in the interior of the body but also two extendable rails. Holding devices for further equipment not shown in the drawing, such as water-skis, surf-boards, camping equipment etc., which can be molded into the floor as well, can also be provided in the interior. Since the body 6 can also be produced from FRP, it is possible to provide the inside of the body with integrated holding devices for the different pieces of equipment.

A number of hinged closure elements 14, which engage the hull (7) and attach it to the body, are located at the top edge of the trailer body. To remove the boat, these closure elements are opened and the boat is pushed back to the point where the hull tips. A cable winch 15, the cable 16 of which is attached to the bow 17 of the boat, is located on the section of the chassis 2 in front of the body, so that the tipping of the boat can be carried out in a controlled manner. When the hull slides back, this cable 16 runs on a guide roller not illustrated in the drawing that is located at the top front edge of the body. It is practical if a roller 18 is fitted at each side of the top back edge of the body, over which the hull can roll.

A roller blind 19, that can be pulled across the whole of the top surface of the body, is provided to cover the interior when the hull of the boat has been removed. The two side edges of this roller blind are guided in rails 20.

The base of the body is also provided with the recesses 21 shown in diagrammatic form in FIG. 4, in which counterbalancing weights 22 that make sure the trailer is kept in balance can be placed. This balancing operation is needed to guarantee that the trailer performs effectively when pulled, in cases where only some of the originally planned equipment or different equipment is being transported.

I claim:

1. A trailer with front and rear ends and lateral sides comprising at least two vertical walls, a floor and a top thereof which together define an interior space, wherein said floor of said trailer is provided with a plurality of recesses sunken below a level of the floor, said recesses each having a horizontal perimeter, said perimeter closely engaging an exterior surface of a horizontal cross-section of one of a plurality of rigid counterbalancing weight means for counterbalancing the contents of said interior space of said trailer so as to provide stability in use wherein said plurality of recesses are disposed adjacent said front and rear ends, and adjacent lateral portions of said floor of said trailer, and wherein said counterbalancing weight means are shaped so as to be interchangeable between said recesses so as to provide proper weight balance for said trailer depending on the position of the contents of the trailer.

2. A trailer as in claim 1, and further comprising:
   at least one longitudinally positioned channel attached to a body floor for engaging at least one motorcycle wheel.

3. A trailer as in claim 1, wherein said trailer is further provided with access means in the rear of said trailer so that said interior space is accessible.

4. A trailer as in claim 1, wherein a recreational boat hull may be placed atop said trailer for the purpose of transporting said hull, said hull being placed so as to rest upon said vertical walls of said trailer.

5. A trailer as in claim 1, and further comprising; at least one rear door having a vertical axis of rotation.

* * * * *